Patented July 10, 1951

2,560,034

UNITED STATES PATENT OFFICE 2,560,034

PREPARATION OF ALKYLTIN CARBOXYLATES

Kenneth C. Eberly, Akron, Ohio, assignor to The Firestone Tire & Rubber Company, Akron, Ohio, a corporation of Ohio No Drawing. Application March 17, 1949, Serial No. 82,001

6 Claims. (Cl. 260—429)

This invention relates to the preparation of alkyltin carboxylates and, more particularly, to dibutyltin diacetate and tributyltin acetate. According to this invention the acetate (or other carboxylate containing two to eighteen carbon atoms) is obtained from the corresponding chloride (or other halide) by reaction with potassium acetate (or other alkali metal or alkaline earth metal carboxylate) in an anhydrous organic solvent. The process is applicable to the preparation of such carboxylates from mono-, di- and tri-alkyltin chlorides, bromides and iodides containing alkyl groups of two to eight carbon atoms. A mixture of halides may be used and a mixture of carboxylates may be produced. Different alkyl groups may be united to the same tin atom.

The alkyltin carboxylates are stabilizers for halogen-containing plastics, etc. The invention will be described more particularly as applied to the preparation of di-n-butyltin diacetate and tri-n-butyltin acetate.

The reaction yields potassium chloride or other alkali metal or alkaline earth halide. The conversion is accomplished in solution in an organic solvent or mixture of organic solvents in which this metal halide is insoluble and the desired carboxylate is soluble. If both the metal halide and desired carboxylate are soluble in the solvent, the metal halide will be separated by addition of a non-solvent. On heating, a smooth reaction occurs and a high yield of product is obtained.

The process may be used to produce an alkyltin salt of acetic, propionic, butyric, valeric, hexoic, nonanoic, lauric, palmitic, oleic, stearic, myristic, benzoic, furoic, phthalic, succinic, sebacic, adipic, maleic, fumaric, malonic, citric or tricarballylic acid, etc.

The solvents which may be used include, for example, n-propyl alcohol, isopropyl alcohol, dioxane, benzene, toluene, xylene, ethyl acetate, propyl acetate, ethylene glycol, diethylene glycol, monoethyl ether of ethylene glycol, dimethyl ether of tetraethylene glycol, monoethyl ether of diethylene glycol, ethyl propionate, etc.

The process is illustrated by the following examples, but it is to be understood that it is not limited to the solvents, temperatures or time referred to specifically therein.

Example 1

Eighty-seven and six-tenths grams of di-n-butyltin di-chloride were dissolved in 100 cc. of absolute alcohol and treated with 59.8 grams (5 per cent excess) of anhydrous potassium acetate dissolved in 300 cc. of absolute alcohol. A white precipitate of potassium chloride came down at once, and the whole was stirred at 75° C. for 20 minutes and then filtered. The cake of potassium chloride was washed with alcohol and dried. A yield of 42.7 grams of potassium chloride (theory=43.85 grams) was obtained. The combined filtrates were evaporated down, and a white solid which appeared to be mixed potassium acetate and potassium chloride separated in small quantity. The addition of a small amount of benzene threw out what appeared to be most of the solid inorganic matter. The whole was filtered and washed with benzene. The combined filtrates were freed of alcohol and benzene and distilled at 10 mm. pressure. The fraction boiling at 142–145° C. (uncorrected) which was practically the whole of the distillate, was collected as dibutyl tin diacetate. The yield was 93.6 grams. It was tested for purity by titration with sodium hydroxide. One gram of this product consumed 56.45 cc. of 0.1000N sodium hydroxide as contrasted with a theoretical consumption of 57.00 cc. of 0.1000N sodium hydroxide per gram of pure dibutyltin diacetate. The final product was free of chlorine.

Example 2

Two thousand seven hundred and twenty grams of tri-n-butyltin chloride (containing 4.2 per cent di-n-butyltin chloride) were dissolved in 7 liters of absolute alcohol. 912 grams of anhydrous potassium acetate (about 5 to 10 per cent excess) were added with stirring for about one hour while the alcohol solution was heated to about 60 to 65° C. The KCl which precipitated was filtered off. The alcohol was distilled off and tri-n-butyltin acetate was obtained and recrystallized from methylethyl ketone to produce an asbestos-like fibrous product.

The compounds which may be produced according to the process of this invention include, for example:

Ethyltin tributyrate
Trimethyltin propionate
Octyltin trihexoate
Diheptyltin dilaurate
Methylethyltin distearate
Propyltin trioleate
Tripentyltin palmitate, etc.

What I claim is:

1. The process of producing an alkyltin carboxylate containing two to eight carbons in each alkyl group and two to eighteen carbon atoms in each acid group, which comprises reacting in an inert organic solvent an alkyltin halide of said alkyl chain length with a carboxylate of the class consisting of alkali metal and alkaline earth metal carboxylates of said chain length, and separating from the solution the resulting metal halide.

2. The process of producing an alkyltin carboxylate containing two to eight carbons in each alkyl group and two to eighteen carbon atoms in each acid group, which comprises reacting an alkyltin halide of said alkyl chain length with a carboxylate of the class consisting of alkali metal and alkaline earth metal carboxylates of said chain length, and carrying out the reaction in an inert organic solvent in which the resulting metal halide is insoluble whereby the metal halide is separated from the solution, and recovering the alkyltin carboxylate from the solution.

3. The process of producing a butyltin acetate which comprises reacting a butyltin chloride with potassium acetate in an inert organic solvent in which potassium chloride is insoluble.

4. The process of producing dibutyltin diacetate which comprises reacting dibutyltin dichloride with potassium acetate in absolute alcohol.

5. The process of producing tributyltin acetate which comprises reacting tributyltin chloride with potassium acetate in absolute alcohol.

6. The process of producing a butyltin acetate which comprises separately dissolving butyltin chloride and potassium acetate in separate portions of absolute alcohol, mixing the solutions and heating, adding benzene to separate any dissolved organic matter, filtering, and then removing the benzene and alcohol by distillation.

KENNETH C. EBERLY.

REFERENCES CITED

The following references are of record in the file of this patent:

UNITED STATES PATENTS

| Number | Name | Date |
| --- | --- | --- |
| 2,344,002 | Rugely | Mar. 14, 1944 |